United States Patent
Breckenridge, Jr.

[15] 3,662,527
[45] May 16, 1972

[54] GRASS CATCHER

[72] Inventor: Wilbur T. Breckenridge, Jr., 2677 Brookmead Lane, La Jolla, Calif. 92037

[22] Filed: June 11, 1970

[21] Appl. No.: 45,479

[52] U.S. Cl. ................................................56/200
[51] Int. Cl. .............................................A01d 53/06
[58] Field of Search..............56/200, 203, 199, 202, 204

[56] References Cited

UNITED STATES PATENTS

| | | |
|---|---|---|
| 625,669 | 5/1899 | Gorr ................................56/200 |
| 3,002,332 | 10/1961 | Shane ..............................56/203 |
| 1,881,618 | 10/1932 | Jacobsen ..........................56/200 |

FOREIGN PATENTS OR APPLICATIONS

| | | |
|---|---|---|
| 18,957 | 8/1914 | Great Britain ....................56/200 |

*Primary Examiner*—Louis G. Mancene
*Assistant Examiner*—J. N. Eskovitz
*Attorney*—Carl R. Brown

[57] ABSTRACT

A grass catcher that is supported on the front of a lawn mower, such as a reel type lawn mower, for upward pivotal movement in a direction normal to the path of movement of the mower, and a lifting arrangement operable from a position spaced from the grass catcher for lifting and pivoting the grass catcher to dump accumulated grass cuttings to the side of the mower and out of the path of movement of the mower.

11 Claims, 5 Drawing Figures

INVENTOR.
WILBUR T. BRECKENRIDGE, JR.

BY

*Carl R. Brown*

ATTORNEY

INVENTOR.
WILBUR T. BRECKENRIDGE, JR.

BY

ATTORNEY

GRASS CATCHER

BACKGROUND OF THE INVENTION

There are many types of grass catchers for lawn mowers. These grass catchers may be positioned to the side of the lawn mower or in front of the lawn mower or to the rear of the lawn mower. In general, the known grass catchers are of the type that releasably attach to the lawn mower and are separated when full of grass clippings and then dumped at some remote location. With the advent of power driven lawn mowers and particularly power driven lawn mowers of the reel type, it is possible to mow large lawn areas of relatively heavy grass. This causes the accumulation of grass cuttings in grass catcher receptacles to occur rapidly requiring numerous dumpings of the grass catcher receptacle. Such dumpings can become very laborous for larger lawns. Thus many persons are eliminated from operating power lawn mowers, such as of the reel type where means are provided to collect the grass as it is cut, because the persons do not have sufficient strength to dump the grass catcher. Further, such known means of dumping grass catchers are unnecessarily time consuming.

In partial recognition of the foregoing situation, there have been developed grass catching devices that are secured to reel type lawn mowers and that are capable of being dumped from the operators position. However these grass catching devices do not utilize any means for reducing the labor required in such dumpings, and further they normally dump the grass directly in front of the mower.

Thus it is advantageous to have a new and improved grass catcher for power type lawn mowers, such as reel type lawn mowers, that is positionable in front of the lawn mower and that is capable of being dumped to the side of the path of the lawn mower thus not interfering with the forward movement of the lawn mower, and that utilizes spring balancing for lifting the grass catcher, thus facilitating quick and easy operation of dumping the grass catcher in such a manner that the mower may continue its normal path of operation during and following the dumping process.

SUMMARY OF THE INVENTION

In an exemplary embodiment of this invention, a grass catcher receptacle is supported by frame means on a lawn mower, primarily of the motor driven reel type. The frame means includes longitudinal members on each side of the lawn mower with ends that project in front of the lawn mower. The grass catcher is secured for pivotal movement to one of the frame members and the other side of the grass catcher receptacle rests on the opposite frame member. An overhead member positioned above the grass catcher and normally above the pivotal connection of the grass catcher to the frame member, supports a line that is attached to the free end of the grass catcher receptacle. So by pulling on the line, the free end of the grass catcher is lifted, pivoting the grass catcher, for example, from left to right in vertical movement around the pivotal connection thus dumping the grass cuttings from the grass catcher to the side of the path of movement of the lawn mower.

The free end of the line that actuates the dumping action is connected to a spring loaded reel that exerts a pulling force on the line so that the grass catcher receptacle exerts only a small downward force on the frame. Thus the spring loaded reel aids the lifting of the grass catcher and exerts braking force on the movement of the grass catcher to its extended position in the dumping. A pull line is attached to the line and is grasped by the operator at the operator's position, to pull up the left side of the grass catcher to flip it over to the right side of the mower. When the grass has fallen out of the grass catcher, the operator then pulls the pull line again which pulls the line and flips the grass catcher receptacle back to the supported position on the supported frame. The spring loaded reel aids in braking the extreme movement of the grass catcher in both directions of rotational movement. The grass catcher further has means for disconnecting the line from the grass catcher structure and means for releasing the pivotal connection, so that the grass catcher receptacle can be removed from the frame and dumped manually, if desired. Further, the grass catcher has retainer means that allows vertical movement of the receptacle when the receptacle contacts, for example, rocks and other obstructions in the lawn; thus preventing damage to the grass catcher receptacle and the supporting frame. So it is possible to quickly and easily dump the grass catcher receptacle during the normal operation of the lawn mower, without impeding the movement of the lawn mower in its normal path in cutting the lawn.

It is therefore an object of this invention to provide a new and improved grass catcher for lawn mowers.

It is another object of this invention to provide a new and improved grass catcher that is particularly adaptable for use with power driven reel type lawn mowers, which grass catcher receptacle may be operated from the operator's position to dump the grass cutting contents to a location out of the path of movement of the lawn mower, while the receptacle remains attached to the lawn mower.

It is another object of this invention to provide a new and improved grass catcher for lawn mowers, that is operable from a position removed from the grass catcher receptacle, and has lifting and pivoting means with spring balancing type lifting support, that aids in lifting and moving the grass catcher receptacle to and from the dumping position.

It is another object of this invention to provide a new and improved grass catcher for lawn mowers having a grass cutter receptacle that may be pivotally moved from the operator's position to and from the dumping position and that can also be manually dumped as desired.

Other objects and many advantages of this invention will become more apparent upon a reading of the following detailed description and an examination of the drawing wherein like reference numerals designate like parts throughout and in which.

Figure 5:
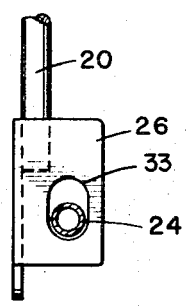
FIG. 5 is a cross sectional view with parts broken away taken along lines 5—5 of FIG. 1.

Referring now to the drawings, a power driven lawn mower 12 generally illustrated in phantom, supports a grass catcher frame structure. The grass catcher frame structure includes longitudinal members 24 and 25 that are secured to the sides of the lawn mower structure 12 that, in this illustrative embodiment, comprises a power driven reel type lawn mower. An L-shaped beam member 25 is secured by end member 31 to the left side of the lawn mower and is supported by support 27 with the forward end projecting forward of the lawn mower structure and having a downward projecting support plate 29 for supporting the free side of the grass catcher receptacle 16. On the right side of the lawn mower structure 12, a rod, tube or pipe 24 is secured in and fixed to a cylindrical support 32, that is in turn fixed to a support plate 30 that is secured to the lawn mower structure in any suitable manner. Pipe 24 is supported by a retainer plate 26, see FIG. 5, that has a slot 33 therein. This slot 33 permits vertical movement of rod or pipe 24 to allow vertical movement of the grass catcher receptacle 16 should the grass catcher receptacle 16 contact obstacles in the path of the movement of the lawn mower. The connection of the pipe 24 in support 32 allows sufficient movement of pipe 24 in slot 33 to accomplish the foregoing.

The grass catcher receptacle 16 has a generally rectangular or box shape with openings 60 and 61 in the sides thereof for grasping by the user's hands. The side of the grass catcher receptacle 16 adjacent the cutting reel portion of the lawn mower 12, has a reduced in height, inclined wall that permits the grass cuttings to move from the reel directly into the receptacle 16 and not to drop through the space therebetween. Secured to the right side of the grass catcher 16 is a cylindrical member or pipe 40 that is sized to fit over the end of the pipe or rod 24 and abut against end collar 34. A retaining collar 36 fits over the outer end of pipe 24 and aligned holes receive a pin 38 for locking the retaining collar 36 in position, thereby holding the grass cutter receptacle 16 onto the supporting pipe 24.

A lifting means for lifting, pivoting and flipping the grass catcher receptacle 16 to and from the dumping position, comprises a pair of vertically directed and angled members 22 and 23 that are secured at their lower ends to plates 30 and 31 and are secured together at their other ends by connection 19. Vertical brace member 20, that is secured to plate 26, provides vertical support for the inclined frame members 22 and 23. Secured to the apex of the frame member 22 and 23 is pully 50 for supporting the line or cord 48 in the known manner. The lifting line 48 is secured by normal snap connection 51 to an eyelet 49 that is fixed to the left side of the grass catcher receptacle 16. The lifting line 48 extends through the pulley 50 and through a retainer 56 that has a wear bushing therein with the end terminating in a spring loaded reel 58. A pull line 52 is secured by tying or the like at 53 to the lifting line 48. The free end of the pull line 52 rests in a V-shaped support 46 that is supported by member 42 onto the lawn mower structure 12. A knob 47 aids in grasping and pulling the free end of the pull line 52.

Figure 1:
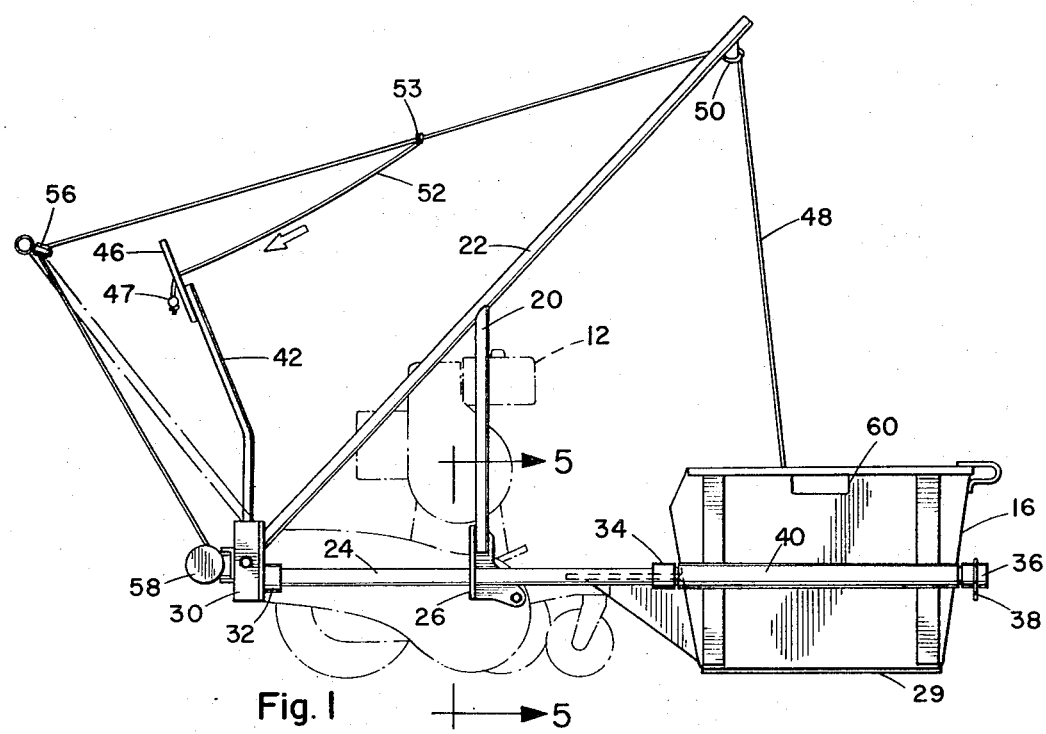
FIG. 1 is a side view of an embodiment of the grass catcher of this invention with the lawn mower structure illustrated in phantom.
Figure 2:
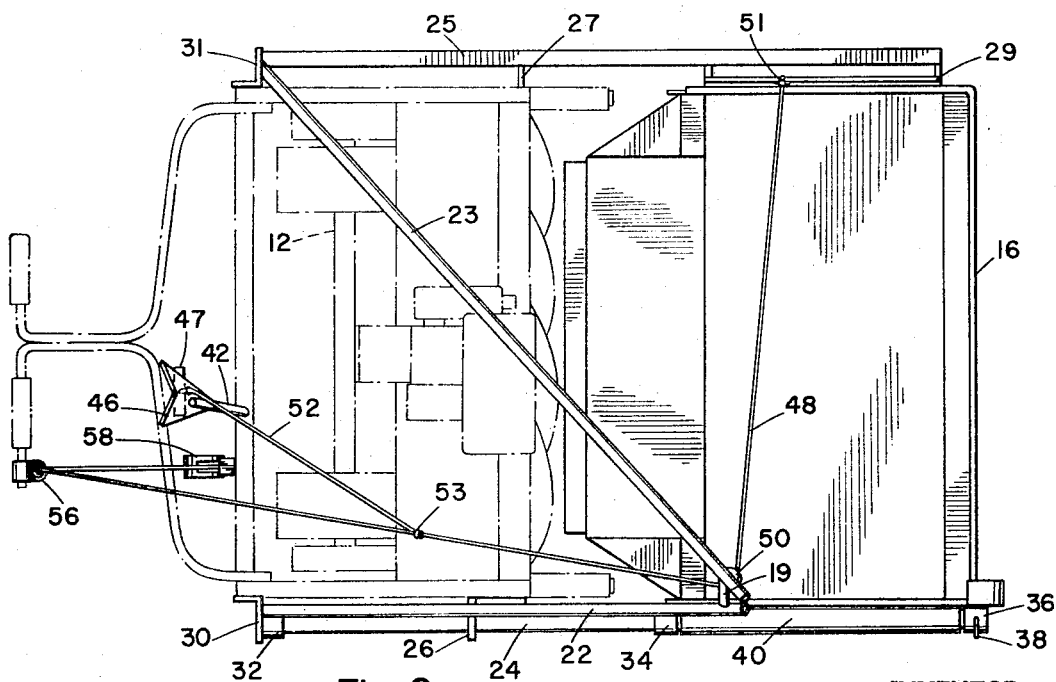
FIG. 2 is a top plan view of the grass catcher illustrated in FIG. 1.
Figure 3:
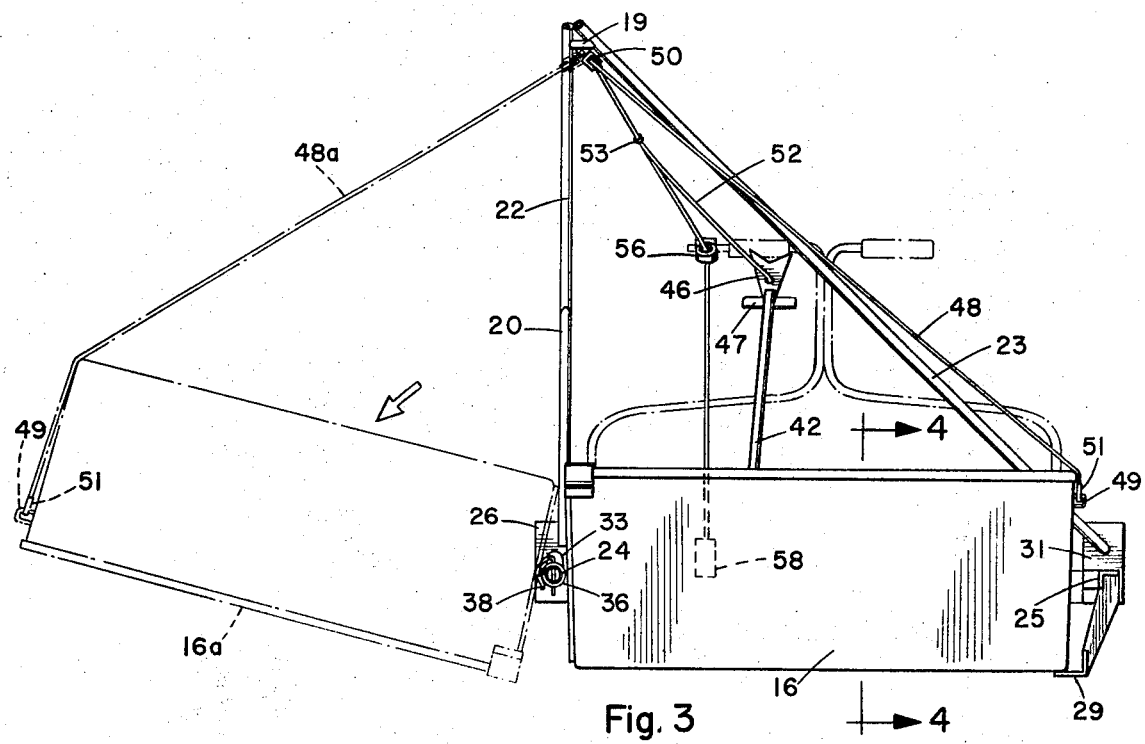
FIG. 3 is a front end elevation view of the embodiment illustrated in FIGS. 1 and 2, with the grass catcher receptacle illustrated in phantom being pivoted to the dumping position.
Figure 4:
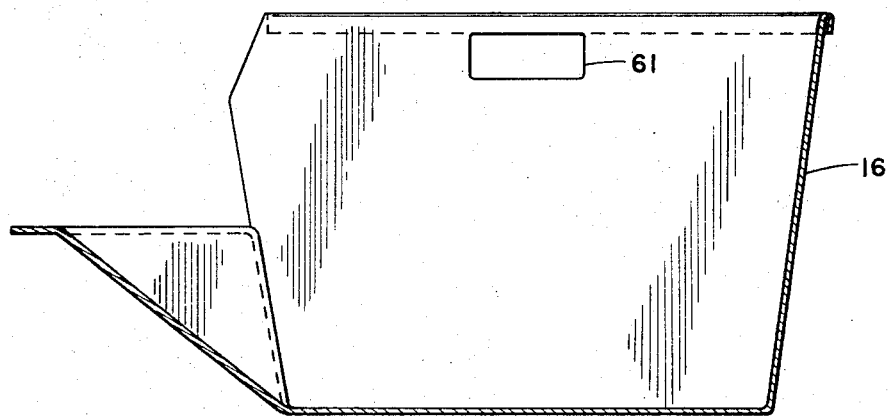
FIG. 4 is a cross sectional view of the grass catcher receptacle taken along lines 4—4 of FIG. 3.

As may be observed in FIG. 3, by pulling on pull line 52, the lifting line 48 lifts the left side of the grass catcher receptacle 16 pivoting the grass catcher receptacle on its tubular support 40 to the flipped over dumping position illustrated in dotted lines 16a in FIG. 3. The reel 58 is spring loaded so that it exerts maximum pulling force on line 48 when the line is in the maximum unwound condition in reel 58. Accordingly, the maximum support force on line 48 exists when the grass cutter receptacle is in one or the other of the two positions illustrated in FIG. 3. The spring loaded reel is selectively adjustable to provide a lifting force that allows a slight downward force by weight of gravity of the empty receptacle 16 so that it rests on frame support 29 without bouncing. This spring loaded force thus supplies the maximum lifting force in aiding an lifting the loaded grass catcher receptacle 16 for its flipping movement to the position illustrated in FIG. 3. In the dumping position, the spring loaded reel 58 exerts sufficient force to stop the movement of the grass catcher receptacle 16 in the position indicated so that the grass catcher receptacle does not contact or bounce against the ground.

In operation, the lawn mower 12 is operated in the normal manner with the lawn mower reel cutting the grass and causing the grass to move into the grass catcher receptacle 16. When grass cuttings have accumulated in the grass catcher receptacle 16, then knob 47 of line 52 is grasped by the operator, either during continued movement of the lawn mower 12 or at a momentary stopping of the lawn mower 12, and is pulled with sufficient force that with the aid of the force of the spring loaded reel 58 quickly and easily flips the grass catcher receptacle 16 to the dumping position illustrated in FIG. 3. This dumps the grass cuttings to a location beside the path of movement of the lawn mower and by pulling on line 52 returns the grass catcher receptacle 16 to its original position while the lawn mower continues operation uninterrupted.

Should the lawn mower and grass catcher be operated in a location where it is not desirable to dump the grass to the side of the lawn mower because of adjacent walks, driveways or the like, then pin 38 is removed from the holes in the supporting pipe 24 and retainer collar 36 and the snap end 51 is unsnapped from eyelet 49. The grass catcher 16 is then manually supported and dumped at a more desirable location. Further during operation, should the grass catcher receptacle 16 contact any obstacle, it will immediately raise up by movement of the pipe 24 in slot 33 to pass over the obstacle, which at the same time alerts the operator of the contact of an obstacle by the grass catcher receptacle, allowing the operator to stop the forward movement of the lawn mower 12 and thus protect the mowing reel.

Having described my invention, I now claim.

1. A tiltable grass catcher for use in association with a lawn mower having an operator's position, comprising:
   frame means for securing a grass catcher receptacle to the front of a lawn mower;
   a grass catcher receptacle for resting on said frame means in a position to catch grass cut by the lawn mower;
   pivotal connection means for securing said receptacle to said frame means for pivotal tilting movement of said grass catcher receptacle;
   and lift means operable from said operator's position for pivoting said receptacle on said pivotal connection means to a position for dumping grass cuttings therefrom by a first actuation of said lift means and operable to return said catcher receptacle to its position on said frame by a sequential actuation of said lift means. said lift means including a resilient member having a retracted and extended position, said extended position existing when said receptacle occupies said grass catching position and said grass dumping position 2. A grass catcher for lawn mowers as claimed in claim 1 in which,
   said lift means includes a member secured to said frame means that projects above said receptacle,
   and movable means capable of being secured to said receptacle for coacting with said member to lift said receptacle.

3. A grass catcher for lawn mowers as claimed in claim 2 in which,
   said member projects substantially over said pivotal connection,
   and said movable means includes a line with one end attached to the free side of said receptacle and which line coacts with said member to pull said free side upwardly and pivot said receptacle over said pivot point.

4. A grass catcher for lawn mowers as claimed in claim 3 in which,
   said member has means for slidably moving and guiding said line,
   and the free end of said line extends to the lawn mower operator's position where the operator may exert pulling force on the line in the operator's position and dump the receptacle.

5. A grass catcher for lawn mowers comprising:
   frame means for securing a grass catcher receptacle to the front of a lawn mower;
   a grass catcher receptacle for resting on said frame means in a position to catch grass cut by said lawn mower;
   pivotal connection means for securing said receptacle to said frame means for pivotal, tilting movement of said grass catcher receptacle;
   and lift means operable from a location spaced from said receptacle for pivoting said receptacle on said pivotal connection means to dump grass cuttings therefrom;
   said lift means includes a member secured to said frame means that projects above said receptacle;
   and movable means capable of being secured to said receptacle for coacting with said member to lift said receptacle;
   said member projects substantially over said pivotal connection;
   said movable means includes a line with one end attached to the free side of said receptacle and which line coacts with said member to pull said free side upwardly and pivot said receptacle over said pivot point;
   said member has means for slidably moving and guiding said line;
   the free end of said line extends to the lawn mower operator's position where the operator may exert pulling force on the line in the operator's position and dump the receptacle;

and spring-biased take-up reel means that receives the free end of said line for exerting pulling force on said line and said receptacle to substantially counter-balance the weight of said receptacle when said receptacle is in substantially a horizontal position.

6. A grass catcher for lawn mowers as claimed in claim 5 in which,
said reel means has means for preventing said receptacle from contacting the ground in the dumping position.

7. A grass catcher for lawn mowers as claimed in claim 6 which,
said line has a pull line attached between said member and said reel, which pull line has a free end that extends to the operator's position.

8. A grass catcher for lawn mowers as claimed in claim 7 including,
guide means in the operator's position for guiding said line to said reel means,
and support means for supporting the free end of said pull line.

9. A grass catcher for lawn mowers as claimed in claim 2 in which,
said frame means includes at least a longitudinal member secured to each side of the lawn mower,
one of said longitudinal members has a rod end projection,
said receptacle has a tube on one side for fitting on said rod and rotating on said rod,
and the longitudinal member on the other side of the lawn mower has a frame projection for supporting the other side of said receptacle.

10. A grass catcher for reel type lawn mowers as claimed in claim 9 in which,
said rod has means on the end for releasably holding said tube and receptacle thereon,
and said line is releasably secured to said receptacle.

11. A grass catcher for lawn mowers as claimed in claim 9 in which,
one end of said rod is secured to the lawn mower at a point spaced from said receptacle,
and retainer means positioned between said secured end of said rod and said receptacle for retaining said rod from downward and sideward movement while allowing upward movement of said rod.

* * * * *